(12) United States Patent
Cornwell et al.

(10) Patent No.: US 7,594,043 B2
(45) Date of Patent: Sep. 22, 2009

(54) REDUCING DISMOUNT TIME FOR MASS STORAGE CLASS DEVICES

(75) Inventors: Michael J. Cornwell, San Jose, CA (US); Christopher P. Dudte, San Jose, CA (US)

(73) Assignee: Apple Inc., Cupertino, CA (US)

( * ) Notice: Subject to any disclaimer, the term of this patent is extended or adjusted under 35 U.S.C. 154(b) by 243 days.

(21) Appl. No.: 11/341,921

(22) Filed: Jan. 27, 2006

(65) Prior Publication Data

US 2007/0180154 A1 Aug. 2, 2007

(51) Int. Cl.
*G06F 13/00* (2006.01)

(52) U.S. Cl. .................. 710/33; 710/300; 710/304; 710/20; 710/13

(58) Field of Classification Search .................. 326/37; 365/185; 369/30; 710/1, 15, 16, 303, 5; 714/54; 713/300; 709/219, 188, 237
See application file for complete search history.

(56) References Cited

U.S. PATENT DOCUMENTS

| | | | |
|---|---|---|---|
| 5,602,987 A | 2/1997 | Harari | |
| 5,671,229 A | 9/1997 | Harari | |
| 5,719,808 A | 2/1998 | Harari | |
| 6,149,316 A | 11/2000 | Harari | |
| 6,404,707 B1 | 6/2002 | Kaneda et al. | |
| 6,426,893 B1 | 7/2002 | Conley | |
| 6,721,820 B2 | 4/2004 | Zilberman | |
| 6,757,842 B2 | 6/2004 | Harari | |
| 6,763,424 B2 | 7/2004 | Conley | |
| 6,799,226 B1 | 9/2004 | Robbin et al. | |
| 6,914,846 B2 | 7/2005 | Harari | |
| 6,947,332 B2 | 9/2005 | Wallace | |
| 6,998,871 B2 * | 2/2006 | Mulligan | 326/37 |
| 7,137,011 B1 | 11/2006 | Harari | |
| 7,162,569 B2 | 1/2007 | Conley | |
| 7,237,046 B2 | 6/2007 | Paley et al. | |
| 7,237,074 B2 | 6/2007 | Guterman | |
| 7,240,219 B2 | 7/2007 | Teicher et al. | |
| 2003/0187654 A1 * | 10/2003 | Hoshino | 704/270 |
| 2005/0021880 A1 | 1/2005 | Robbin et al. | |
| 2005/0185526 A1 * | 8/2005 | Altare | 369/30.23 |
| 2006/0212637 A1 * | 9/2006 | Lo et al. | 710/303 |

OTHER PUBLICATIONS

WUSBS, Wireless Universal Serial Bus Specification, WUSBS, 2005, pp. 1, 17, 19, 29, 78-79, 120.*

* cited by examiner

*Primary Examiner*—Henry W. H. Tsai
*Assistant Examiner*—Cheng-Yuan Tseng
(74) *Attorney, Agent, or Firm*—Fish & Richardson P.C.

(57) ABSTRACT

Techniques for reducing dismount time for a peripheral device connected to an external host device are presented. Instead of waiting for a dismount procedure to complete, a reply message indicating that dismount operations have been completed is sent to the external host device. This triggers a message from the external host device that the peripheral device is ready to be safely removed. The peripheral device completes the dismount operations including cache and memory cleanup after the reply message indicating that dismount operations have been completed is sent to the external host device. The dismount operations may be completed under battery power if necessary. This enables quicker unplugging of the peripheral device from the external host device and can allow the peripheral device to transition from a first mode into a second mode faster.

25 Claims, 3 Drawing Sheets

REDUCING DISMOUNT TIME FOR MASS STORAGE CLASS DEVICES

BACKGROUND

The present disclosure relates to peripheral disk drive devices, logical disk drives, mass storage class devices, and techniques for connecting to an external host device.

In typical operation, a peripheral device such as a peripheral disk drive, a logical disk drive, a mass storage class device, or another removable or portable storage device is periodically connected to an external host (i.e., by plugging into a desktop or laptop computer using a USB cable or a FireWire cable) to transfer data between the peripheral device and the external host device. The time required to establish communications is called a "mount time," and the time required to end the communications is called a "dismount time." To ensure proper continuing operation of the peripheral device, proper mount and dismount procedures should be observed. For example, removing the physical connection (USB or FireWire cable) between the external host device and the peripheral device before completing the dismount procedure can lead to data loss or corruption of data.

The time it takes to mount or dismount the peripheral device from the external host device can be irritatingly long for many users. Particularly, a mass storage class device such as a handheld, portable music player device requires time to switch from a playback mode of operation into a storage mode of operation. For example, an MP3 player may have a logical storage device (flash memory) or a disk drive device for storing music files. The flash memory typically has a "virtual" spin-up time, and the disk drive has a "physical" disk spin-up time for accessing stored files. When the MP3 player is connected to the external host device, the MP3 player switches from a mode for playing music files into a mode for reading/writing to and from the storage device (flash memory or disk drive). Among other things, the time needed to switch between the two modes includes spin-up time of the storage device. Conversely, when the MP3 player is disconnected from the external host device, the MP3 player switches from the mode for reading/writing to and from the storage device into the mode for playing music files, which includes time to stop and clear the storage device.

SUMMARY

Techniques for reducing dismount time for mass storage devices are described.

In one aspect, managing data storage includes receiving a dismount message associated with a connection between a peripheral device and a host device, responding to the dismount message with a reply message indicating a completed dismount, and completing dismount operations after responding with the reply message indicating a completed dismount.

Implementations may include one or more of the following features. Managing data storage can include concurrently performing both initiating the dismount operations and responding to the dismount message with the reply message indicating a completed dismount. Alternatively, dismount operations can be initiated after responding to the dismount command with the reply message indicating a completed dismount. Managing data storage can also include switching the peripheral device from a first mode into a second mode in response to receiving the dismount message. The first mode is associated with file transfer access between the peripheral device and the host device, and the second mode is associated with playback of at least one multimedia file selected from a group consisting of a music file, a video file, a picture file, and a document file on the peripheral device. The dismount message can be initiated by the peripheral device or by the host device using an application program executing on the host device. The dismount operations can include memory clean up functions. When the peripheral device is physically disconnected from the host device, the dismount operations are performed using battery power. The peripheral device can be selected from a group consisting of a peripheral disk drive device, a logical disk drive, a removable storage device, a portable device that includes a storage media, and a mass storage device.

These aspects can be implemented using an apparatus, a method, a system, or any combination of an apparatus, methods, and systems. The details of one or more implementations are set forth in the accompanying drawings and the description below. Further features, aspects, and advantages will become apparent from the description, the drawings, and the claims.

BRIEF DESCRIPTION OF DRAWINGS

Like reference symbols in the various drawings indicate like elements.

DETAILED DESCRIPTION

The following describes techniques for reducing the mount time of a peripheral disk drive device or other mass storage class device in response to a request or instruction to unplug the peripheral device from an external host device. In the following description, for the purpose of explanation, numerous specific details are set forth to provide a thorough understanding of the present disclosure. It will be apparent, however, to one of ordinary skill in the art that the present disclosure may be practiced without these specific details. In other instances, well-known structures are shown in block diagram form to avoid unnecessarily obscuring the present disclosure.

Figure 1:
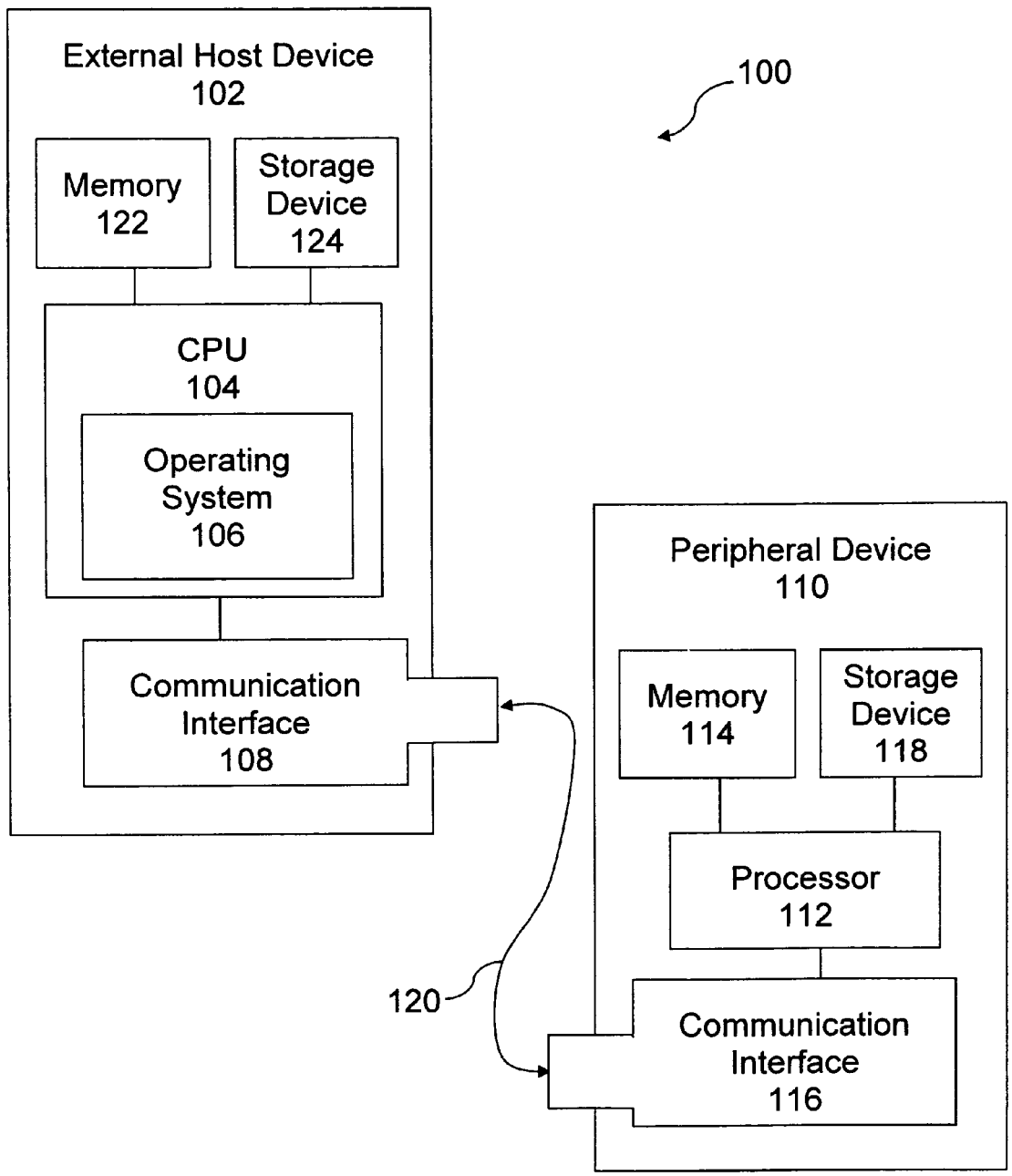
FIG. 1 is a block diagram of a peripheral device access system.

FIG. 1 is a block diagram of a peripheral device access system 100 according to one implementation of a technique for reducing dismount time of a peripheral disk drive device or other mass storage class device. The peripheral device access system 100 includes at least a peripheral device 110 and an external host device 102. The peripheral device 110 may be a peripheral disk drive device, a logical disk drive device, a mass storage class device, or other removable and/or portable memory devices. The peripheral,device 110 includes at least a processor 112, a memory 114, a storage device 118, and a communication interface 116. The memory 114 may include a volatile RAM-based memory devices such as RAM, DRAM, SDRAM, DDRAM, and other similar devices. The storage device 118 may include a non-volatile storage device such as ROM, Flash ROM, CompactFlash, and magnetic disk devices. The storage device 118 may also be portable and/or removable. The external host device 102 may be a personal computer, a laptop computer, or some other computing device. The external host device 102 may include at least a central processing unit (CPU) 104, an operating system 106, a communication interface 108, a memory 122 and a storage device 124. The memory 122 may include a volatile RAM-based memory devices such as RAM, DRAM, SDRAM, DDRAM, and other similar devices. The storage device 124 may include a non-volatile storage device such as ROM, CD-ROM, Flash ROM, CompactFlash, and magnetic disk devices. Other components not shown such as input/output devices may readily be implemented on either or both of the external host device 102 and the peripheral device 110.

The peripheral device 110 is connected to the external host device 102 through a communication link 120. The communication link 120 is a bi-directional communication link between the peripheral device 110 and the external host device 102. In some implementations, the communication link 120 is a physical cable or wire link compatible with typical data communication standards including IEEE 1394 (FireWire) connection, Universal Serial Bus (USB) connection, or other serial or parallel data connections. The communication link 120 typically physically connects to a communication interface 116 on the peripheral device 110 and a communication interface 108 on the external host device 102. The communication interfaces 108 and 116 on the external host device 102 and the peripheral device 110 are compatible with one of the data communication standards (e.g. FireWire or USB) mentioned above.

The peripheral device 110 can be a mass storage class device such as a portable computing device dedicated to processing media such as audio, video, or images. For example, the peripheral device 110 may be a music player such as an MP3 player, a game player, a video player, a video recorder, a camera, an image viewer, an IPOD® portable media player available from APPLE Computer of Cupertino, Calif., and the like. These devices are generally battery operated and highly portable so as to allow a user to listen to music, play games or video, record video, or take pictures wherever the user travels.

The peripheral device 110 may be a peripheral disk drive including an external hard disk drive. In yet other implementations, the peripheral device may be a logical disk drive including a flash memory device.

The peripheral device 110 may store various types of data in memory 114 and storage device 118. For example, one type of data stored can be user-selected data (e.g., media files). Media files can include various music, video, image, game, document, and other standard media files in various standard formats. Possible media file formats are described in detail below in connection to FIG. 2 below. Media files may be accessed by the user while operating the peripheral device in a mode operative to execute playback of the media file. In addition, the peripheral device can also store metadata (e.g., directory information) to indicate organization of the user-selected files stored in the memory 114 or the storage device 118. The external host device 102 may need to access such information when transferring files between the peripheral device 110 and the external host device 102. Other types of data may also be stored in the peripheral device as appropriate or desired by the user and may depend on the type and specification of the peripheral device 110.

The peripheral device 110 may be connected to the external host device 102 to exchange files or other data between the devices. In implementations where the peripheral device 110 is a mass storage class device such as a portable music and/or video storage and playback device, the peripheral device 110 typically transitions between at least two modes of operation: (1) a music playback mode; and (2) a disk mode, in which music or other files can be transferred to or from the device. In this second mode of operation, access to the storage media is generally handled from the external host device 102. The device 110 can only be in one of these two modes of operation at a time to ensure that database synchronization is maintained. The device 110 may be periodically connected to the external host device 102 through the communication link 120, which causes the device 110 to switch from the music playback mode to the disk mode. When the device 110 is plugged into the external host device 102, a virtual "inject" message is generated, which causes the switch to the disk mode. When the device 110 is to be disconnected, a virtual "eject" instruction is sent to the device 110. For example, such an instruction can be generated when a disconnect command is requested by a user through an interaction with an external application program or with the operating system of the external host device 102.

Figure 2:
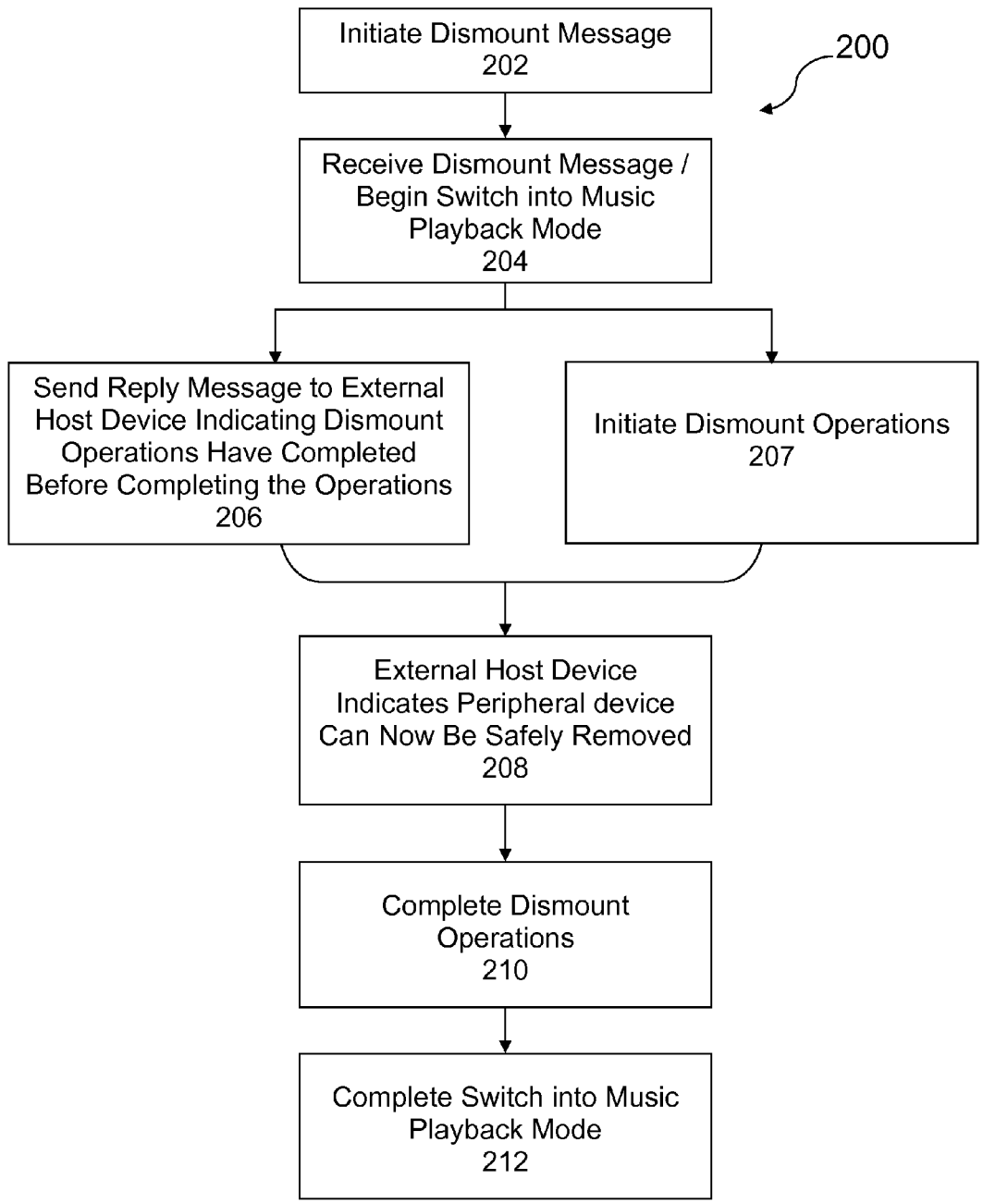
FIG. 2 is a flow chart depicting a process of reducing the dismount time for the peripheral device to disconnect from the external host device.

FIG. 2 is a flow chart depicting a process of reducing dismount time of the peripheral device 110 disconnecting from the external host device 102. This technique can be used to reduce the time needed for the peripheral device 110 to send a dismount complete message to the external host device 102. At step 202, a dismount command is initiated. The dismount command may be initiated either from the external host device 102 or from the peripheral device 110. In some implementations, the dismount command is initiated at the peripheral device 110. The peripheral device 110 can initiate the dismount command if the peripheral device 110 receives an internal message, alarm or notification to eject. For example, if the peripheral device 110 is an integrated mobile phone and media player device, and an incoming call needs to be received and protected. In this instance, all commands related to accessing media on the peripheral device 110 will be discontinued and the dismount command will be initiated. The peripheral device 110 sends the dismount command and notifies the host deice 102 that the peripheral device 110 is switching out of disk mode. If a command follows to access data residing on the peripheral device 110, that command is failed by the peripheral device 110. The peripheral device 110 performs and finishes dismount process independent of the host device 102. In some implementations, the dismount command is initiated by a user interacting (e.g., through a user interface selection to disconnect the peripheral device 110) with an application program (e.g. ITUNES® application software available from APPLE Computer of Cupertino, Calif.) executing on the external host device 102 configured to read and/or write data or files to and from the peripheral device 110. In some implementations, the dismount command may be initiated by the user interacting with an operating system 106 of the external host device 102. When a peripheral device 110 is plugged into and communicating with a Windows® (operating system) based external host device 102, the user may select a "safely remove hardware" icon from the systems tool bar of Windows® operating system. In some implementations, such as for the APPLE (computer) operating system (Mac® OS), the user may drag the icon representing the peripheral device 110 into the Trash Bin icon. The dismount command may also be initiated automatically by software or otherwise in response to a predetermined event, for example.

At step 204, the dismount command is received by the peripheral device 110 to indicate that the peripheral device 110 needs to perform dismount operations to allow for a safe physical disconnect from the external host device 102. Once the dismount command is received, the peripheral device 110 may begin a transition process from a first mode of operation into a second mode of operation. The dismount operations include ceasing operations that are used in communicating with the external host device 102 and/or ceasing operations that facilitate the disk mode; and performing operations that place the peripheral device 110 in a state that enables the use of the peripheral device 110 in a standalone mode or playback mode. The dismount operations many also include generating operation specific messages to warn or notify the user. The messages may be displayed using a graphical user interface on the external host device 102 and/or the peripheral device 110. The messages may also be generated as audio files to be played through the external host device 102 and/or the peripheral device 110. For example, if a file transfer operation is currently running when the dismount command is received, a warning message may be displayed on the external host device 102 and/or the peripheral device 110 to notify the user that file transfer has not been completed and that continuing with the dismount operations may result in the file being lost or damaged. The dismount operations may also include clean up functions such as cache (e.g., flushing cache) and memory clean up functions.

The safe physical disconnect may involve physically disconnecting the communication link 120 (e.g. wire/cable) from between the peripheral device 110 and the external host device 102 after any necessary communications between the peripheral device 110 and the external host device 102 are complete. In many cases, the communication link 120 (e.g., through a USB or FireWire communication link) not only provides a data communication link but also acts as a power source for the peripheral device 110. Therefore, removing the physical connection not only removes the data communication link but also disconnects the power source from the peripheral device 110. Also in many cases (e.g., WINDOWS® (operating system) based systems), the receipt of a dismount complete message from the peripheral device 110 causes the external host device 102 to turn off power supplied via the communication link 120 even before the communication link 120 is physically disconnected. To help avoid loss or corruption of data, ensure that proper clean up functions are performed, and/or otherwise complete necessary dismount operations, the external host device 102 waits for a dismount complete message from the peripheral device 110 before providing an indication (e.g., in a user interface pop-up window) that the peripheral device 110 can be safely removed.

In accordance with one feature of the technique for reducing the dismount time, the dismount complete message is returned to the external host device 102 by the peripheral device 110 at step 206 before completing the cleanup functions. The dismount complete message may be returned to the peripheral device 110 while at the same time initiating the clean up functions at step 207 in parallel. In general, the dismount complete message may be returned to the peripheral device 110 any time after any other necessary communications with the external host device 102 are complete, which is typically significantly sooner than when the clean up functions are complete. Once the dismount complete message is received by the external device 102, the external host device 102 can indicate that the peripheral device 110 can be safely removed at step 208 (e.g., using a message or icon on a user interface). Safe removal of the peripheral device may involve physically removing the communication link 120 connecting the peripheral device 110 and the external host device 102. If the dismount operations have not been completed, the peripheral device 110 continues to perform the dismount operations including cache and memory cleanup functions at step 210 even after the peripheral device 110 has been physically disconnected from the external host device 102. Generally, these dismount operations are performed using power from a battery of the peripheral device 110.

At step 212, the peripheral device 110 may finish the transition from the first mode of operation to the second mode of operation. In some implementations, the peripheral device 110 may switch from the disk mode to the music playing mode. The music playing mode is associated with playing multimedia files, such as audio files, video files, and picture files. Audio files may include files compatible with MP3, WAV, RAM, RA, AAC, M4II, or any other format suitable for storing music. Video files may include files compatible with MPEG, WMV, WMA, AVI, MOV, QT, RM, RMVB, ASF, or any other format suitable fore storing video. Picture files may include files compatible with TIF, JPG, GIF, PSD, BMP, PNG, or any other format suitable for storing images. In some implementations, files other than multimedia files including text and document files may be accessed during when the peripheral device is in a standalone mode. The disk mode is associated with file transfer access between the peripheral device 110 and the external host device 102.

The peripheral device 110 can be physically disconnected from the external device 102 (i.e., by removing the communication link 120) before the cleanup functions are completed and before the peripheral device 120 finishes the transition from the first mode of operation into the second mode of operation. Thus, the cleanup functions and the transition from the first mode of operation into the second mode of operation are continued and finished under battery power after safe physical removal of the peripheral device 110 from the external host device 102. This enables quicker dismount (e.g., a user can unplug an IPOD® portable media player or other device quicker than in a conventional system) and, in some cases, a quicker switch into the second mode of operation.

In some implementations, the peripheral device 110 may initiate cache (e.g., flushing cache) and memory cleanup functions after sending the dismount complete message. For example, FIG. 3. depicts an alternate implementation 300, where the dismount operations (e.g. cache and memory cleanup functions) are initiated at step 307 after sending the dismount complete message at step 306. At step 302, a dismount message is initiated either by the external host device 102 or the peripheral device 110. At step 304, the peripheral device 110 receives the dismount message. At step 306, the dismount complete message is sent to the external host device 102 to indicate that the dismount operations have been completed even though not all of the dismount operations have actually been completed. At step 307, dismount operations including cache and memory cleanup functions are initiated after sending the dismount complete message. Having received the dismount complete message, the external host device 110 indicates at step 308 that the peripheral device can now be safely removed. Once the actual dismount operations have been completed at step 310, even after the physical connection between the external host device 102 and the peripheral device 110 has been removed, the peripheral device completes the switch from the first mode into the second mode.

In some implementations, the process of reducing the dismount time, as described above, may be applied to a flash memory peripheral device. In other implementations, the process may be applied to a disk drive peripheral device. The reduction in dismount time can be useful in any type of peripheral device that uses a safe dismount procedure but can be particularly valuable for a flash memory device because a flash memory device is relatively slow in writing data. Typically, a flash memory device can write data at a rate of roughly 3-4 Mbytes/sec to 9-10 Mbytes/sec while a disk drive can write data at a rate of about 18-20 Mbytes/sec.

Figure 3:
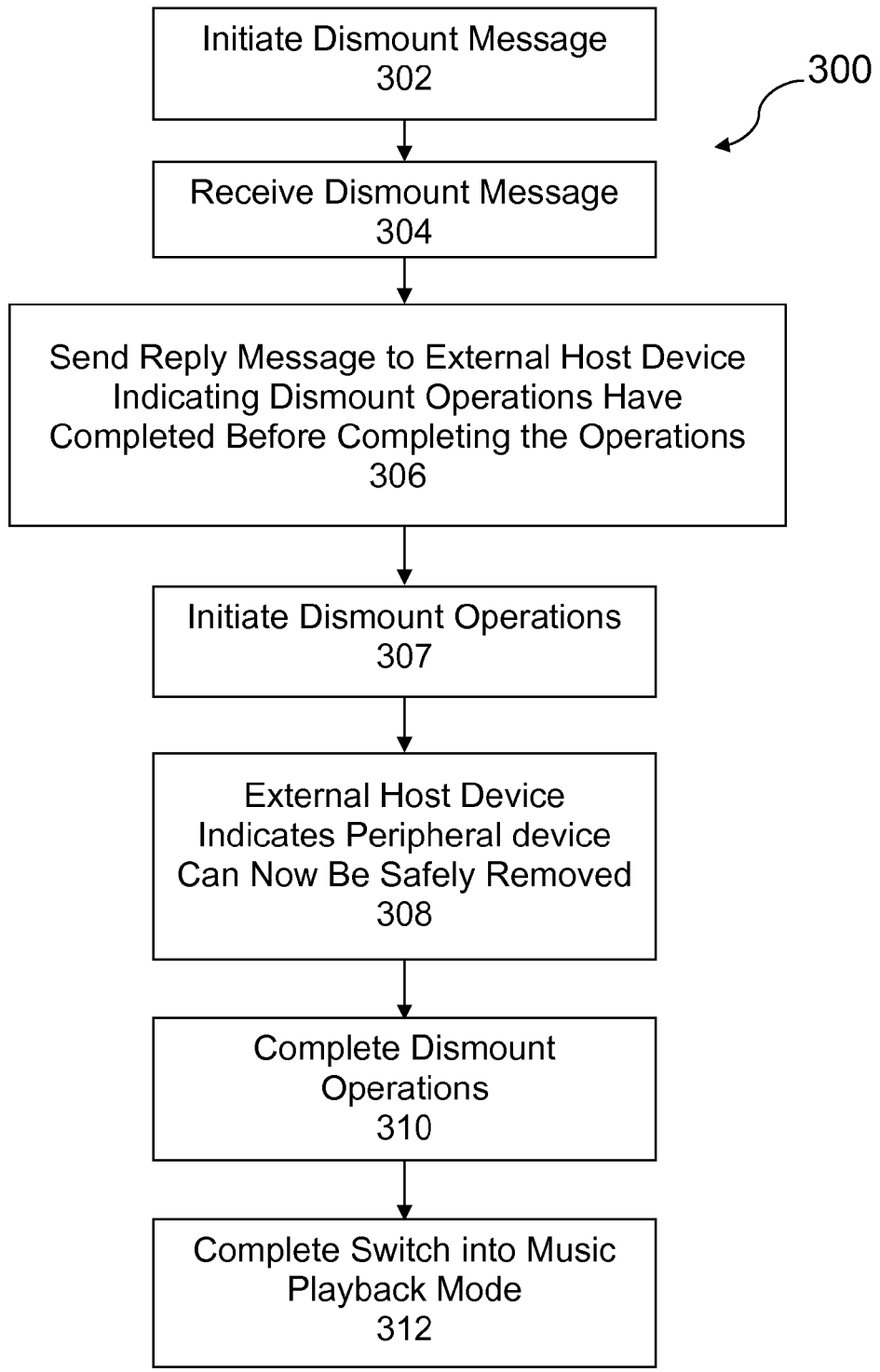
FIG. 3 is a flow chart depicting an alternate process of reducing the dismount time for the peripheral device to disconnect from the external host device.

In some implementations, the techniques for reducing the dismount time when unplugging the peripheral device 110 from the external host device 102 as described in FIGS. 2-3 may be implemented using one or more computer programs comprising computer executable code stored on a computer readable medium and executing on the peripheral device 110, the external host device 102, or both. The computer readable medium may include a hard disk drive, a flash memory device, a random access memory device such as DRAM and SDRAM, removable storage medium such as CD-ROM and DVD-ROM, a tape, a floppy disk, a CompactFlash memory card, a secure digital (SD) memory card, or some other storage device. In some implementations, the computer executable code may include multiple portions or modules, with each portion designed to perform a specific function described in connection with FIGS. 2-3 above. In some implementations, the techniques may be implemented using hardware such as a microprocessor, a microcontroller, an embedded microcontroller with internal memory, or an erasable programmable read only memory (EPROM) encoding computer executable instructions for performing the techniques described in connection with FIGS. 2-3 above. In other implementations, the techniques may be implemented using a combination of software and hardware.

Processors suitable for the execution of a computer program include, by way of example, both general and special purpose microprocessors, and any one or more processors of any kind of digital computer, including graphics processors, such as a GPU. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

A number of implementations of the disclosure has been described. Nevertheless, it will be understood that various modifications may be made without departing from the spirit and scope of the disclosure.

What is claimed is:

1. A method for managing data storage, the method comprising:

receiving, at a peripheral device, a dismount message associated with a connection between the peripheral device and a host device;

responding, at the peripheral device, to the dismount message with a reply message to the host device indicating a completed dismount before completing dismount operations; and completing, at the peripheral device, the dismount operations after responding with the reply message indicating a completed dismount.

2. The method of claim 1 further comprising initiating the dismount operations and responding to the dismount message with the reply message indicating a completed dismount concurrently.

3. The method of claim 1 further comprising initiating the dismount operations after responding to the dismount command with the reply message indicating a completed dismount.

4. The method of claim 1 further comprising switching the peripheral device from a first mode into a second mode in response to receiving the dismount message, wherein the first mode is associated with file transfer access between the peripheral device and the host device, and the second mode is associated with playback of at least one multimedia file selected from a group consisting of a music file, a video file, a picture file, and a document file on the peripheral device.

5. The method of claim 1 wherein the dismount message is initiated at the peripheral device.

6. The method of claim 1 wherein the dismount message is initiated by the host device.

7. The method of claim 6 wherein the dismount message is initiated by an application program executing on the host device.

8. The method of claim 1 wherein the dismount operations comprise memory clean up functions.

9. The method of claim 8 wherein the dismount operations are completed using battery power.

10. The method of claim 1 wherein the peripheral device is selected from a group consisting of a peripheral disk drive device, a logical disk drive, a removable storage device, a portable device that includes a storage media, and a mass storage device.

11. A machine readable medium storing instructions operative to cause data processing apparatus to:

receive, at a peripheral device, a dismount message associated with a connection between the peripheral storage device and a host device;

respond, at the peripheral device, to the dismount message with a reply message to the host device indicating a completed dismount before completing dismount operations; and perform, at the peripheral device, at least some of the dismount operations after responding with the reply message indicating a completed dismount.

12. The machine readable medium of claim 11 wherein the instructions are further operable to switch the peripheral device from a first mode into a second mode in response to receiving the dismount command, wherein the first mode comprises file transfer access between the peripheral device and the host device, and the second mode enables playback of at least one multimedia file selected from a group consisting of a music file, a video file, a picture file, and a document file on the peripheral device.

13. The machine readable medium of claim 11 wherein the instructions are further operable to initiate the dismount message from the host device.

14. The machine readable medium of claim 13, wherein the instructions are further operable to initiate the dismount message from an application program executing on the host device.

15. The machine readable medium of claim 11, wherein performing at least some dismount operations further comprises performing memory clean up functions.

16. The machine readable medium of claim 15, wherein the instructions are further operable to perform at least some dismount operations using battery power.

17. The machine readable medium of claim 11, wherein the peripheral device is selected from a group consisting of a peripheral disk drive device, a logical disk drive, a removable storage device, a portable device that includes a storage media, and a mass storage device.

18. A peripheral device, comprising:
a processor operable to:
receive a dismount message associated with a connection between the peripheral device and a host device;
respond to the dismount message with a reply message to the host device indicating a completed dismount before completing dismount operations; and
perform at least some of the dismount operations after responding with the reply message indicating a completed dismount;
a battery operable to provide power to the peripheral device when the peripheral device is disconnected from the host device; and
a volatile memory operable to temporarily store data at least when the peripheral device is connected to an external host device.

19. The peripheral device of claim 18 wherein the processor is further operable to switch the peripheral device from a first mode into a second mode in response to receiving the dismount message, wherein the first mode is associated with file transfer access between the peripheral device and the host device, and the second mode is associated with playback of at least one multimedia file selected from a group consisting of a music file, a video file, a picture file, and a document file on the peripheral device.

20. The peripheral device of claim 18 wherein the dismount operations comprise memory clean up functions.

21. The peripheral device of claim 18 wherein the peripheral device is selected from a group consisting of a peripheral disk drive device, a logical disk drive, a removable storage device, a portable device that includes a storage media, and a mass storage device.

22. A peripheral device, comprising:
a processing means operable to:
receive a dismount message associated with a connection between the peripheral device and a host device;
respond to the dismount message with a reply message to the host device indicating a completed dismount before completing dismount operations; and
perform at least some of the dismount operations after responding with the reply message indicating a completed dismount;
a battery means operable to provide power to the peripheral device when the peripheral device is connected from the host device; and
a volatile memory means operable to temporarily store data at least when the peripheral device is connected to an external host device.

23. The peripheral device of claim 22 wherein the processor means is further operable to switch the peripheral device from a first mode into a second mode in response to receiving the dismount message, wherein the first mode is associated with file transfer access between the peripheral device and the host device, and the second mode is associated with playback of at least one multimedia file selected from a group consisting of a music file, a video file, a picture file, and a document file on the peripheral device.

24. The peripheral device of claim 22 wherein the dismount operations comprise memory clean up functions.

25. The peripheral device of claim 22 wherein the peripheral device is selected from a group consisting of a peripheral disk drive device, a logical disk drive, a removable storage device, a portable device that includes a storage media, and a mass storage device.

* * * * *